(12) United States Patent
Symes et al.

(10) Patent No.: US 6,313,197 B1
(45) Date of Patent: Nov. 6, 2001

(54) POLYMERIC MATERIALS AND THEIR USE

(75) Inventors: Kenneth Charles Symes; Kishor Kumar Mistry, both of West Yorkshire (GB)

(73) Assignee: CTBX Specialty Chemicals Water Treatment, Bradford (GB)

( * ) Notice: Subject to any disclaimer, the term of this patent is extended or adjusted under 35 U.S.C. 154(b) by 0 days.

(21) Appl. No.: 09/635,263

(22) Filed: Aug. 9, 2000

Related U.S. Application Data

(62) Division of application No. 09/107,407, filed on Jun. 30, 1998, now Pat. No. 6,127,499.

(30) Foreign Application Priority Data

| Jun. 30, 1997 | (GB) | 9713800 |
| Jun. 30, 1997 | (GB) | 9713812 |
| Oct. 9, 1997 | (GB) | 9721477 |

(51) Int. Cl.[7] ........................... C08L 51/00
(52) U.S. Cl. ............ 523/201; 523/200; 523/206; 524/504; 525/64; 526/271
(58) Field of Search ................ 523/201, 200, 523/206; 524/504; 525/64; 526/271

(56) References Cited

U.S. PATENT DOCUMENTS

| 3,136,736 | 6/1964 | Washburne et al. . |
| 3,580,880 | 5/1971 | Clarke et al. . |
| 3,677,991 | 7/1972 | Moore . |
| 3,875,262 | 4/1975 | Milne . |
| 3,991,226 | 11/1976 | Kosel . |
| 4,810,751 | 3/1989 | Jellinek et al. . |

FOREIGN PATENT DOCUMENTS

| 455165 | 2/1972 | (AU) . |
| 707018 | 4/1996 | (EP) . |
| 1198052 | 7/1970 | (GB) . |
| 1 231 614 | 5/1971 | (GB) . |
| 1 268 692 | 3/1972 | (GB) . |
| 2 207 681 | 2/1989 | (GB) . |
| 94/25560 | 11/1994 | (WO) . |
| 95/07613 | 3/1995 | (WO) . |
| 97/24177 | 7/1997 | (WO) . |
| 97/24179 | 7/1997 | (WO) . |

*Primary Examiner*—Tae H. Yoon
(74) *Attorney, Agent, or Firm*—Sughrue, Mion, Zinn, Macpeak & Seas, PLLC

(57) ABSTRACT

A polymeric amphipathic stabiliser is formed of hydrophobic monomer units and hydrophilic monomer units which comprise carboxylic free acid or acid salt units and glycidyl or anhydride units. The glycidyl or anhydride units react onto reactive groups on polymer particles when dispersed in non-aqueous liquid and provide improved stability when the particles are subsequently dispersed in liquid electrolyte.

5 Claims, No Drawings

POLYMERIC MATERIALS AND THEIR USE

This is a divisional of application Ser. No. 09/107,407 filed Jun. 30, 1998, now U.S. Pat. No. 6,127,499 the disclosure of which is incorporated herein by reference.

This invention relates to polymeric stabilisers and to the formation of polymeric particles, i.e. particles having an external surface of organic polymer, which give improved stability when dispersed in a liquid, and to dispersions containing them.

WO97/24179 and WO97/24177 (PCT/GB96/03233 and PCT/GB96/03231) were not published at the first priority date of this application but describe various processes and products wherein a dispersion of polymer particles is formed in the presence of an amphipathic polymeric stabiliser in a non-aqueous medium, and then the particles are dispersed in an electrolyte, namely a detergent concentrate. The entire disclosure of those two publications and applications is herein incorporated by reference.

Those polymeric stabilisers are materials which are known for use in, for instance, reverse phase polymerisation processes, either reverse phase emulsion polymerisation or reverse phase bead polymerisation processes.

The requirement for effective stabilising properties in these very different media necessitates the provision of improved stabilisers suitable for such conditions of media.

Different types of dispersions are known from, for instance, GB-A-1,198,052, GB-A-1,231,614, GB-A-1,268, 692, GB-A-2,207,681, AU-A-455,165, U.S. Pat. Nos. 3,580, 880, 3,875,262, EP-A-707,018 and EP-A-719,085.

According to the invention, we provide novel polymeric amphipathic stabilisers. Amphipathic stabilisers are stabilisers which contain both hydrophobic groups and hydrophilic groups, both groups being present in amounts sufficient to allow the stabiliser to partition at the interface between aqueous and non-aqueous phases.

The novel stabilisers of the invention are addition polymers of hydrophobic monomer units and hydrophilic monomer units wherein the hydrophilic monomer units comprise carboxylic free acids or acid salt units and reactive monomer units selected from (a) glycidyl monomer units and (b) anhydride monomer units wherein the amount of anhydride monomer units is either below 10% by weight of total monomer units or is less than 19% by weight of total carboxylic acid monomer units.

Because the polymers are addition polymers of glycidyl or anhydride monomer units, the polymers have a polymeric backbone carrying the glycidyl or anhydride units as groups which are pendant to the backbone hydrocarbon chain and which are thus available for covalent reaction with other reactive groups. The monomers are all ethylenically unsaturated monomers.

The amount of the reactive monomer units is usually at least 0.5% and preferably at least 1% (by weight of total monomers). It may be at least 5%, for instance at least 10%. Usually it is not above 50% and most usually it is not above 30% by weight of total monomers. However best results are usually obtained with quite low amounts of the glycidyl or anhydride monomer, e.g, down to 0.5 or 1% and preferably not more than 5% or 10%. Amounts of 0.5 to 5%, often around 1 to 3%, are often preferred.

In use, the amphipathic polymer is reacted onto the polymeric particles in a dispersion, so as to stabilise the dispersion. We believe that the use of the preferred low amounts of reactive groups is desirable because it allows the stabilisers to be permanently attached to the particles at points which are, on a molecular scale, spaced far apart. This results in the other units of the polymeric stabiliser being able to adopt their normal configuration with respect to the particles and, in particular, it allows for appropriate spacing of the hydrophobic units and the hydrophilic units, and it allows for appropriate steric displacement of the units relative to one another and from particles. If the amount of reactive units in the stabiliser is too high then there is a tendency for the stabiliser to be bonded, on a molecular scale, at such closely spaced points around the particles that the effectiveness of the stabiliser is inhibited.

The glycidyl monomer can be any ethylenically unsaturated glycidyl derivative, whereby the ethylenically unsaturated moiety polymerises into the backbone of the polymer and the glycidyl group is pendant.

The glycidyl derivative can be glycidyl acrylate but is preferably glycidyl methacrylate.

When the reactive groups are anhydride monomer units, they are anhydride groups of dicarboxylic acid monomers, for example maleic acid. They can be introduced by copolymerisation of maleic anhydride with other monomers such as maleic acid or other carboxylic acid, or they can be introduced by polymerisation of maleic anhydride or other anhydride monomer followed by hydrolysis of some of the groups. The extent of hydrolysis is preferably high, so that the amount of maleic anhydride or other anhydride groups is less than 19% and preferably less than 15 or 17%, of the total carboxylic acid monomer units.

We have described in, for example, British applications GB 9713812.7 and 9713310.1 on Jun. 30th 1997 and in PCT applications filed even date herewith claiming priority from those and carrying references PRL03819WO and PRL03821WO certain processes utilising stabilisers containing anhydride groups, and it is mentioned therein that the stabiliser may be derived by hydrolysis of 20 to 80% of the carboxylic acid monomer units.

The other monomers in the stabiliser are preferably one or more hydrophobic monomers such as $C_{1-4}$ or other lower alkyl acrylate or methacrylate (preferably methyl methacrylate) and, especially, fatty alkyl acrylate or methacrylate, or styrene or an alkyl styrene. The fatty alkyl group can be $C_{8-32}$, often $C_{10-24}$ and preferably $C_{12-18}$. Any of the hydrophobic monomers conventionally used in amphipathic stabilisers for reverse phase polymerisation may be used in the invention.

The total amount of hydrophobic monomer is usually 30 or 40% up to 70 or 80%, often 40–60%. by weight of monomers. The amount of fatty alkyl methacrylate is often 20–50% by weight of total monomers, the remaining hydrophobic monomer preferably being 0–50%, often 10–40%, methyl methacrylate.

The hydrophilic monomers which may be used may be ionisable monomers such as ethylenically unsaturated carboxylic acids, such as acrylic acid or, especially, methacrylic acid. Instead of or in addition to using acrylic or methacrylic acid as hydrophilic monomer, a carboxylic acid such as maleic acid (either as the free acid or as the anhydride) may be used. Some or all of the hydrophilic monomer may be a non-ionisable hydrophilic monomer. Preferably the non-ionisable monomer is an ethylenically unsaturated hydroxyalkyl monomer, e.g., a hydroxyalkyl ester of an ethylenically unsaturated acid such as acrylic or methacrylic acid. The hydroxyalkyl group is preferably a $C_{1-8}$ (usually $C_{2-4}$) hydroxyalkyl group such as hydroxyethyl or, preferably, hydroxypropyl. Preferably it is present as the methacrylate ester.

The total amount of hydrophilic monomer may be within the ranges typically used in amphipathic polymeric stabilisers for reverse phase polymerisation processes, and may be as described in the aforementioned PCT publications. For instance the total amount of ethylenically unsaturated carboxylic acid monomer is generally at least 5% by weight but usually not above 30% or 40% by weight. The total amount of ethylenically unsaturated carboxylic acid monomer and glycidyl monomer is generally in the range 5 to 70%, preferably 10 or 20% up to 40 or 50% by weight of monomers.

When hydroxyalkyl monomer is used, the total amount of hydrophilic monomer may be in the ranges given above for carboxylic acid plus glycidyl monomers. Preferably the amount of hydroxyalkyl monomer is 1 to 40%, often 3–20%, by weight of the monomers. If it is used in conjunction with little or no carboxylic monomer (e.g., below 10%), the amount of hydroxyalkyl monomer may be 10 or 15% up to 40%. The hydrophilic monomer component may be a mixture of methacrylic acid and hydroxypropyl (meth) acrylate in a weight ratio of 15:1 to 1:5, often 8:1 to 1:1. For instance there may be 15–30% methacrylic acid and 2–10% hydroxypropyl methacrylate.

Reference should be made to WO97/24179 and WO97/24177 (the entire disclosure of which is herein incorporated by reference) for further details of the monomers which can be used and the amounts of the monomers and for the molecular weight of the stabiliser polymers.

The hydrophobic monomers are preferably the water insoluble nonionic monomers defined therein having a partition coefficient K between hexane and deionised water as defined therein and preferably comprise a combination of lower alkyl methacrylate or styrene (including alkyl styrene) together with fatty alkyl methacrylate.

Preferred polymers are formed of at least 20% and usually 25 to 70% by weight $C_{8-20}$ (meth) acrylate or other fatty acrylic monomers, at least 10% and usually 15 to 40% methyl or other $C_{1-4}$ (meth) acrylate and/or styrene (including alkyl styrene monomers), 5 to 30% by weight (meth) acrylic acid and/or maleic acid (or other ethylenically unsaturated monomer), 0 to 20% hydroxypropyl or other hydroxyalkyl (meth) acrylate and a low amount, generally 1 to 5%, maleic anhydride and/or glycidyl (meth) acrylate. The total amount of ethylenically unsaturated carboxylic acid monomer is generally 5 to 30% and the total amount of hydroxyalkyl monomer (if present) is usually not more 20%, with the total amount of combined hydrophilic monomers (carboxylic, hydroxyalkyl and glycidyl anhydride) generally being not more than 40 or 50% by weight.

A preferred stabiliser is formed of 25–50% fatty alkyl methacrylate (usually stearyl methacrylate in an amount of 30–40%), 1–5% (usually 2–3%) glycidyl methacrylate, 15–40% (usually 20–30%) methyl methacrylate, 5–35% (usually 20–30%) methacrylic acid and 0–20% (often 2–20% usually 3–8%) hydroxypropyl methacrylate. For instance the amounts of the named monomers may be in the proportions 39:2:27:27:5, by weight.

The polymers can be used for stabilising a dispersion of hydrophilic polymer particles in an aqueous medium or a liquid electrolyte, usually an aqueous electrolyte medium. Thus preformed polymer made by any convenient technique can be mixed into the aqueous medium or electrolyte and/or the polymer particles can be formed in the aqueous electrolyte, for instance by a precipitation polymerisation.

The liquid (usually aqueous) electrolyte generally contains at least 0.5% by weight electrolyte, often at least 3% and generally at least 5% up to, for instance, 30% or 50% by weight electrolyte. The electrolyte may be inorganic or organic. The electrolyte may be monomeric or polymeric.

The electrolyte can be a water soluble ionic polymer, for instance a low molecular weight cationic or anionic water soluble polymer such as a polymer formed from water soluble ethylenically unsaturated monomer comprising water soluble ethylenically unsaturated anionic or cationic monomer usually in amount of at least 50% and generally at least 80% by weight and preferably at least 100% by weight of the monomers used for forming that polymer, or the polymer may be a condensation polymer for instance it may be polyethylene imine or dicyan diamide or polyamine polymer.

The surface of the polymer particles must be reacted with the reactive stabilisers. This reaction may be with groups that are chemically bonded into the polymer, for instance as a result of the choice of monomer from which the surface of the polymer particles (or the entire volume of the polymer particles) is made, or may be with material which is trapped in the polymer.

The polymer particles are preferably first provided as a dispersion in a non-aqueous liquid. The dispersion may be formed by dispersing preformed polymer particles into the non-aqueous liquid, or by forming the particles by polymerisation in the non-aqueous liquid.

The particles may be formed of a matrix of a polymer which carries the reactive groups and which, for instance, extends throughout the particles. For instance the particles may be aqueous polymer particles made by polymerising droplets of aqueous monomer or monomer blend while dispersed in a first non-aqueous liquid (for instance by reverse phase polymerisation in a non-aqueous liquid) or the particles may be made by dispersing in a liquid (often a non-aqueous liquid) polymeric material in liquid form and converting it to solid particles. For instance the polymeric material may be introduced as a solution in water or as an emulsion in water and the resultant aqueous polymer particles of solution or emulsion may then be converted to solid form, for instance by distilling or otherwise removing the water from the dispersion of those particles in the first liquid. The particles may contain an active ingredient dispersed throughout the matrix.

As an example, the particles may be formed of a polymer of acrylic acid, hydroxy ethyl acrylate or a glycidyl acrylate, optionally copolymerised with other water soluble monomer such as acrylamide, so that the particles are then formed of an addition polymer having free carboxylic, hydroxyl or epoxy groups, which then serve as the reactive groups.

It is often preferred that the particles should have a shell-core configuration wherein the core contains an active ingredient and the shell is formed of a polymer carrying the reactive groups. The core may include a matrix polymer or may consist solely of reactive ingredient, and optionally a non-polymeric carrier or diluent.

The shell may be formed by any convenient technique. It may be formed by, for instance, coacervation of one or more polymers, wherein at least one of the polymers in the coacervate carries reactive groups. For instance polymers that are used for coacervation may consist of or include polymers carrying the carboxylic groups such as polyacrylic acid or natural polymers such as carboxy methyl cellulose.

Preferably, however, the shell is formed by interfacial condensation (IFC). Suitable combinations of materials for forming the shell by IFC are described in PCT/GB96/03233 which is incorporated herein by reference. Any of these may be used in the invention. Such methods produce aqueous polymer particles, having a hydrophilic core.

The polymer dispersion may be formed in the presence of amphipathic polymeric stabiliser or any other stabiliser. If desired, the dispersion can be formed initially in the presence of a reactive stabiliser as defined herein. Alternatively this may be added after the initial production of the polymer particles.

Accordingly, preferred processes according to the invention are those in which a dispersion is formed in a non-aqueous liquid in the presence of a reactive stabiliser as defined herein (which may be present during the initial formation of the dispersion or may be added after its initial formation) wherein the dispersion has a dispersed phase of non-aqueous polymer particles having reactive groups on their surface which can be reacted with the glycidyl or anhydride groups, this reaction is caused to occur and the particles are then dispersed in the liquid electrolyte.

Generally, however, the stabiliser is added to a dispersion in non-aqueous liquid and which has been formed in the non-aqueous liquid, often in the presence of a different polymeric stabiliser, such as a conventional stabiliser formed of un-reactive hydrophilic and hydrophilic monomer units.

The polymeric stabiliser concentrates at the interface between the aqueous and non-aqueous phases in a reverse phase system and a particular advantage of the use of glycidyl units in the polymeric stabiliser is that it is possible to promote covalent reaction between the glycidyl or anhydride units and reactive groups in the aqueous phase of the dispersion. Accordingly, it is not essential that the glycidyl or anhydride groups should be present during the initial formation of the polymeric stabiliser and, instead of using a glycidyl or anhydride monomer, it is possible in the invention to react glycidyl substitution onto a stabiliser which is free of glycidyl groups so as to form glycidyl monomer units in the polymer.

The glycidyl groups can react with groups which are bonded or physically trapped in the surface of the particle and which contain an active hydrogen (e.g., hydroxyl, carboxylic or amino groups). For instance they can react with diethylene triamine or other primary or secondary amino residues, for instance from IFC reaction using such an amine.

The reaction of the stabiliser with the polymer particles is usually caused while the polymer particles are dispersed in the non-aqueous liquid. Alternatively, if desired the non-aqueous liquid in which the dispersion is first formed may be changed with another non-aqueous liquid or with some other liquid such as a surfactant before the reaction is caused to occur between the stabiliser and the particles, or even before the stabiliser is added to the dispersion particles.

To achieve reaction, the dispersion may be left to react at ambient temperature for, for instance 3 to 48 hours, but preferably the reaction is driven by heating, e.g. 30 to 90° C., preferably 35 to 60° C. or 70° C., for 1 to 8 hours, e.g. 3 to 16 hours at 35 to 55° C.

As a result of utilising a stabiliser which can and does react covalently with the IFC, coacervate or other polymeric surface material which is within the dispersed phase, it is possible to promote the self-stabilising properties of the dispersed phase. Thus the stabilising polymer is covalently reacted to the dispersed particles.

As a result, the stabiliser is not displaced during subsequent handling of the materials, for instance when the original dispersion in non-aqueous liquid is subjected to distillation and/or a solvent swap technique and/or the dispersed particles are dispersed into an aqueous electrolyte and/or into a liquid detergent concentrate, for instance all as described in the WO publications identified above. The dispersions in liquid electrolyte are novel.

The use of relatively small amounts (rather than large amounts) of the glycidyl or anhydride monomer has the result of reducing the number of points at which the stabiliser molecule can react on to the receiving IFC or other surface, and so tends to promote the stabiliser to extend out from the surface. The use of non-ionisable hydrophilic monomer has the advantage of reducing the effect of the ionic content (of the liquid in which the particles are dispersed) on the stabilising properties. Accordingly such monomer can impart solvating or hydrophilic properties which are not significantly reduced by, for instance, changing the environment from a strongly alkaline detergent to a near neutral detergent concentrate.

The novel stabilisers (especially those containing hydroxyalkyl groups and/or low glycidyl content) cause particularly good stabilisation of amine-TPC or other interfacial condensation (IFC) shell particles, for instance in aqueous detergent concentrates. The invention improves stability against agglomeration and/or settling during storage.

When the polymer particles are formed by other techniques, such as reverse phase polymerisation, they may be made by reverse phase polymerisation of an aqueous solution of ethylenically unsaturated monomer or monomer blend in a non-aqueous liquid in conventional manner, in which event the monomers which are being polymerised can include, for instance, ethylenically unsaturated anionic monomers, ethylenically unsaturated cationic monomers or ethylenically unsaturated water soluble anionic monomer (such as acrylamide) and which may be selected to include monomer that will provide an addition polymer having reactive groups that can react with anhydride or glycidyl groups of the stabiliser. For instance the particulate polymer may be formed from monomers that provide free carboxylic, hydroxyl or epoxy groups.

The novel stabilisers can be made by polymerisation and to a molecular weight (typically 10,000 to 200,000 measured by Gel Permeation Chromatography) similar to conventional amphipathic stabilisers which are well known for reverse phase or other polymerisation processes.

The particles which are stabilised in the invention are usually relatively small, for instance having a size at least 90% by weight below 30 $\mu$m, preferably below 10 or 20 $\mu$m, such that they can be provided as a substantially stable dispersion in the detergent concentrate or other aqueous electrolyte. The invention reduces or eliminates the risk of the particles aggregating and/or sedimenting, both at low concentrations (e.g., down to 0.1% by weight) and at higher concentrations (e.g., 5% or even much higher such as 30% or 50% in some liquids. However, the invention also includes the use of the stabilisers to reduce aggregation in bead polymerisation or in other processes where the particles have a size of above 30 $\mu$m, for instance at least 90% in the range 100 to 1000 $\mu$m.

The use of the stabiliser of the invention minimizes the risk of aggregation of the particles and increases the stability of a dispersion of the particles. In particular, the use of the stabilisers is of a special value in processes and products as described in WO97/24179 and WO97/24177 and in the PCT application filed today reference PRL03820WO claiming priority from GB 9713310.1 and in the PCT application filed today reference PRL03821WO claiming priority from GB 9713804.4, the entire disclosure of which is herein incorporated by reference. Thus, as described in those, the polymer particles can be made by interfacial condensation as a shell core configuration with a detergent enzyme entrapped in the core, with the result that a dispersion concentrate in which the particles are dispersed has improved stability and improved separation of the encapsulated enzyme from other materials, such as enzymes, in the continuous phase, all as discussed in those applications.

In particular those applications describe (a) a process for making a dispersion in liquid electrolyte of particles having a size below 30 μm, the process comprising forming a dispersion in a first liquid of particles which have a size of below 30 μm and which have a core containing a detergent active ingredient and a shell which has been formed by interfacial condensation and which has an outer surface which includes reactive groups, and covalently reacting a reactive stabiliser material with some of the reactive groups and thereby forming a dispersion of the particles with the stabiliser material covalently bonded on to the outer surface of the shell of the particles, and dispersing the resultant self-stabilised particles into the liquid electrolyte, and (b) a liquid detergent concentrate containing a dispersion of particles having a size below 30 μm wherein the particles have a shell core configuration, the shell has been made by interfacial condensation and has an outer surface which includes reactive groups, and a reactive stabiliser is covalently bonded with some of the reactive groups on to the surface of the particles.

In each of these, the reactive stabiliser may be as described herein.

The following are examples of the invention

EXAMPLE 1

Amphipathic polymer is made by conventional polymerisation in hydrocarbon of a monomer blend of 65% stearyl methacrylate, 17.5% styrene, 15.05 maleic acid and 2.5% maleic anhydride. This is stabiliser A.

EXAMPLE 2

Amphipathic stabiliser is made by solution polymerisation in a hydrocarbon by conventional techniques of a monomer blend tormed of 55% by weight stearyl methacrylate, 33% methyl methacrylate, 10% methacrylic acid and 2% by weight glycidyl acrylate.

EXAMPLE 3

An oil phase is prepared by diluting 46 g of 20% un-reactive amphipathic emulsion stabiliser with 586 gm of Isopar G solvent (a hydrocarbon).

An aqueous dispersion at pH 5.0 (900 g) comprising precipitated Savinase enzyme, sodium polyacrylate homopolymer, sodium sulphate and boric acid is added to the oil phase under a high shear Silverson mixer to form a water-in-oil emulsion with mean droplet size 3 microns. During this step, the temperature of emulsion is kept below 40° C. After formation of the emulsion, extra 306 g Isopar G and 25 g diethylenetriamine are added with high shear mixing.

A 3% solution of terephthaloyl chloride in Isopar G (562 g) is prepared and this is contacted with the above enzyme emulsion by means of an in-line static mixer to produce polyamide shell capsules.

Next, the capsule suspension is warmed to 40° C. and 182 g of 20% glycidyl polymeric stabiliser B is added. The mixture is then stirred at 40° C. for 16 hours to attach the polymeric stabiliser to the capsule outer shell.

The modified capsules formed above are then placed under vacuum distillation to remove volatile solvent and the volatile solvent is replaced by a less volatile hydrocarbon Isopar M oil 300 gm.

The final product is Savinase capsules suspension in oil having 40 KNPU/g enzyme activity.

The improved enzyme capsules are dosed into commercial heavy-duty liquid detergent at 1.0 KNPU/g enzyme activity and subjected to accelerated storage test at 40° C. After 4 weeks, the capsules remain discrete and uniformly dispersed in the detergent medium.

EXAMPLE 4

An aqueous solution of 50t polyethylene imine (500 g) is added under agitation into an oil phase (500 g) comprising of 10 g Span 85 and 490 g Exxson D-40 hydrocarbon solvent. The coarse emulsion formed is then passed through a high pressure homogeniser to produce water-in-oil emulsion with mean droplet size of 0.5 microns. Next, 5 mls of 40% glutaraldehyde solution is added and the emulsion warmed to 55% to cross-link the polyethylene imine polymer.

After the above cross-linking reaction, 50 g of 20% stabiliser B in Exxsol D-40 is added and the emulsion kept at 50° C. for a further 3 hours. This step covalently bonds the stabilising polymer onto the cross-linked polymer particles.

When the cross-linked polymer emulsion is added to 10% ammonium sulphate solution, the polymer particles disperse and remain uniformly suspended. Even after 3 weeks storage, there is no sign of any instability.

As a comparison, the procedure is repeated except 50 g Exxsol D-40 solvent is added instead of glycidyl stabiliser to the cross-linked polymer particles in oil. When the polymer particles are added to the 10% ammonium salt solution, the polymer particles disperse but aggregate into large flocs after only 1 day storage.

What is claimed is:

1. A dispersion in liquid electrolyte of polymer particles having reacted onto their surfaces a polymeric amphipathic stabiliser comprising an addition polymer of hydrophobic monomer units and hydrophilic monomer units wherein the hydrophilic monomer units comprise carboxylic free acid or acid salt units and reactive monomer units selected from the group consisting of (a) glycidyl monomer units and (b) anhydride monomer units wherein the amount of anhydride units is either below 10% by weight total monomer units or is less than 19% by weight total carboxylic acid monomer units, wherein the polymeric amphipathic stabilizer is reacted onto the surface of the polymer particles via said reactive monomer units.

2. A dispersion according to claim 1 in which the liquid electrolyte is an aqueous solution containing at least 3% electrolyte.

3. A process in which a dispersion of aqueous polymer particles is formed in a non-aqueous liquid containing a stabiliser, wherein the stabiliser is a polymeric amphipathic stabiliser comprising an addition polymer of hydrophobic monomer units and hydrophilic monomer units wherein the hydrophilic monomer units comprise carboxylic free acid or acid salt units and reactive monomer units selected from the group consisting of (a) glycidyl monomer units and (b) anhydride monomer units wherein the amount of anhydride units is either below 10% by weight total monomer units or is less than 19% by weight total carboxylic acid monomer units, and the aqueous polymer particles have reactive groups on their surface which can be reacted with the glycidyl or anhydride groups as a stabiliser, this reaction is caused to occur in the presence of a solvent and the solvent is removed thereafter, and the particles are then dispersed in liquid electrolyte.

4. A process according to claim 3 in which the reactive stabiliser is added to a dispersion in non-aqueous liquid of the polymer particles wherein the dispersion has been formed in the non-aqueous liquid in the presence of a different polymeric stabiliser.

5. A process according to claim 3 in which the dispersion in the non-aqueous liquid has been formed by reverse phase polymerisation or interfacial condensation.

* * * * *

UNITED STATES PATENT AND TRADEMARK OFFICE
CERTIFICATE OF CORRECTION

PATENT NO. : 6,313,197 B1
DATED : November 6, 2001
INVENTOR(S) : Kishor Kumar Mistry and Kenneth Charles Symes It is certified that error appears in the above-identified patent and that said Letters Patent is hereby corrected as shown below:

<u>Title page,</u>
Item [73], Assignee, please change "CTBX" to read -- CIBA --.

Signed and Sealed this

Second Day of August, 2005

JON W. DUDAS
*Director of the United States Patent and Trademark Office*